United States Patent [19]
Okuda

[11] Patent Number: 5,351,735
[45] Date of Patent: Oct. 4, 1994

[54] PNEUMATIC TIRE WITH BELT PLY INCLUDING BOTH STEEL CORDS AND AROMATIC POLYAMIDE CORDS

[75] Inventor: Takaaki Okuda, Shirakaws, Japan

[73] Assignee: Sumitomo Rubber Industries, Ltd., Kobe, Japan

[21] Appl. No.: 47,062

[22] Filed: Apr. 16, 1993

Related U.S. Application Data

[62] Division of Ser. No. 829,275, Feb. 3, 1992, abandoned.

[30] Foreign Application Priority Data

Feb. 5, 1991 [JP] Japan .................. 3-036792

[51] Int. Cl.⁵ .............. B60C 9/18; B60C 9/20; B60C 9/22
[52] U.S. Cl. .................. 152/536; 152/531
[58] Field of Search .................. 152/536, 531

[56] References Cited

U.S. PATENT DOCUMENTS

| | | | |
|---|---|---|---|
| 3,850,219 | 11/1974 | Snyder | 152/536 X |
| 4,073,330 | 2/1978 | Allard | 152/361 |
| 4,890,658 | 1/1990 | Kabe et al. | 152/536 X |

FOREIGN PATENT DOCUMENTS

| | | | |
|---|---|---|---|
| 56-112304 | 9/1981 | Japan | 152/536 |
| 64-83406 | 3/1989 | Japan | 152/536 |
| 2063185 | 6/1981 | United Kingdom | 152/536 |

*Primary Examiner*—Michael W. Ball
*Assistant Examiner*—Adrienne C. Johnstone

[57] ABSTRACT

A pneumatic tire comprises a carcass extending between the bead portion and turned up around bead cores, and a belt disposed radially outside the carcass and inside the tread and comprising at least one ply of cords including steel cords and aromatic polyamide cords.

6 Claims, 4 Drawing Sheets

PNEUMATIC TIRE WITH BELT PLY INCLUDING BOTH STEEL CORDS AND AROMATIC POLYAMIDE CORDS

This application is a divisional of application Ser. No. 07/829,275 filed on Feb. 3, 1992, now abandoned.

The present invention relates to a pneumatic tire, more particularly to an improvement in belt structure.

BACKGROUND OF THE INVENTION

In general, radial tires widely in use are provided with a stiff belt disposed radially outside the carcass. On the other hand, tire performances, for example steering stability, durability, ride comfort and the like are greatly altered by the characteristics of such-belt, for example, belt rigidity. Therefore, it is a very important point in designing tires to adjust such belt characteristics.

Heretofore, such a belt has been made of a steel cord ply or an organic fiber cord ply or a combination thereof as shown in FIGS. 6-8.

FIG. 6 shows a belt layer (A) composed of steel cord plies (a1). In this case, the belt weight becomes heavy, which deteriorates dynamic performance and fuel consumption performance. Further, the tread rigidity is liable to become excessively high in the tread crown region, which deteriorates ride comfort and disturbs the ground pressure distribution.

FIG. 7 shows a belt layer (A) composed of aromatic polyamide cord plies (a2). In this case, the belt weight can be reduced in comparison with the steel cord belt, and the ride comfort is superior to the steel belt tire. However, steering stability is inferior in relation thereto. Further, as the aromatic polyamide cords are poor in buckling strength, the cords are liable to be broken, and separation failure from the surrounding rubber is also liable to occur with decreasing tire durability.

FIG. 8 shows a belt layer (A) composed of a steel cord ply (a1) and an aromatic polyamide cord ply (a2) disposed on the radially outside of the steel cord ply. In this case, there is a large difference in rigidity between the different plies and further the aromatic polyamide cord ply (a2) is poor in adhesion to rubber. Therefore, ply separation failure is liable to occur.

Thus, it is very difficult to improve tire performance all around by using such a conventional belt ply made of single material cords, since the characteristics of the ply are derived from the nature of the cords used, and the characteristics are greatly altered if the cord material is differed. Further, design freedom is restricted.

SUMMARY OF THE INVENTION

It is therefore, an object of the present invention to provide a pneumatic tire having an improved belt structure in which belt characteristics are controllable and, thus, the above-mentioned problems can be solved.

According to one aspect of the present invention, a pneumatic tire comprises a carcass extending between the bead portion and turned up around bead cores, and a belt disposed radially outside the carcass and inside the tread, wherein the belt comprises at least one ply of cords including steel cords and aromatic polyamide cords.

Therefore, the weight of the belt can be reduced in comparison with a belt made of only steel cords.

The belt rigidity is easily adjusted by changing the ratio between the number of the steel cords and the number of the aromatic polyamide cords within the belt ply.

For example, when the percentage of the steel cords is greater in the tread shoulder portion than the tread central portion, the belt rigidity in the shoulder portion becomes higher than that in the central portion. Accordingly, both the steering stability and ride comfort are improved.

Further, when the steel cords and aromatic polyamide cords are arranged alternately, a low resistance to buckling stress and low adhesion of the aromatic polyamide cords are compensated by the steel cords, and accordingly durability can be improved.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
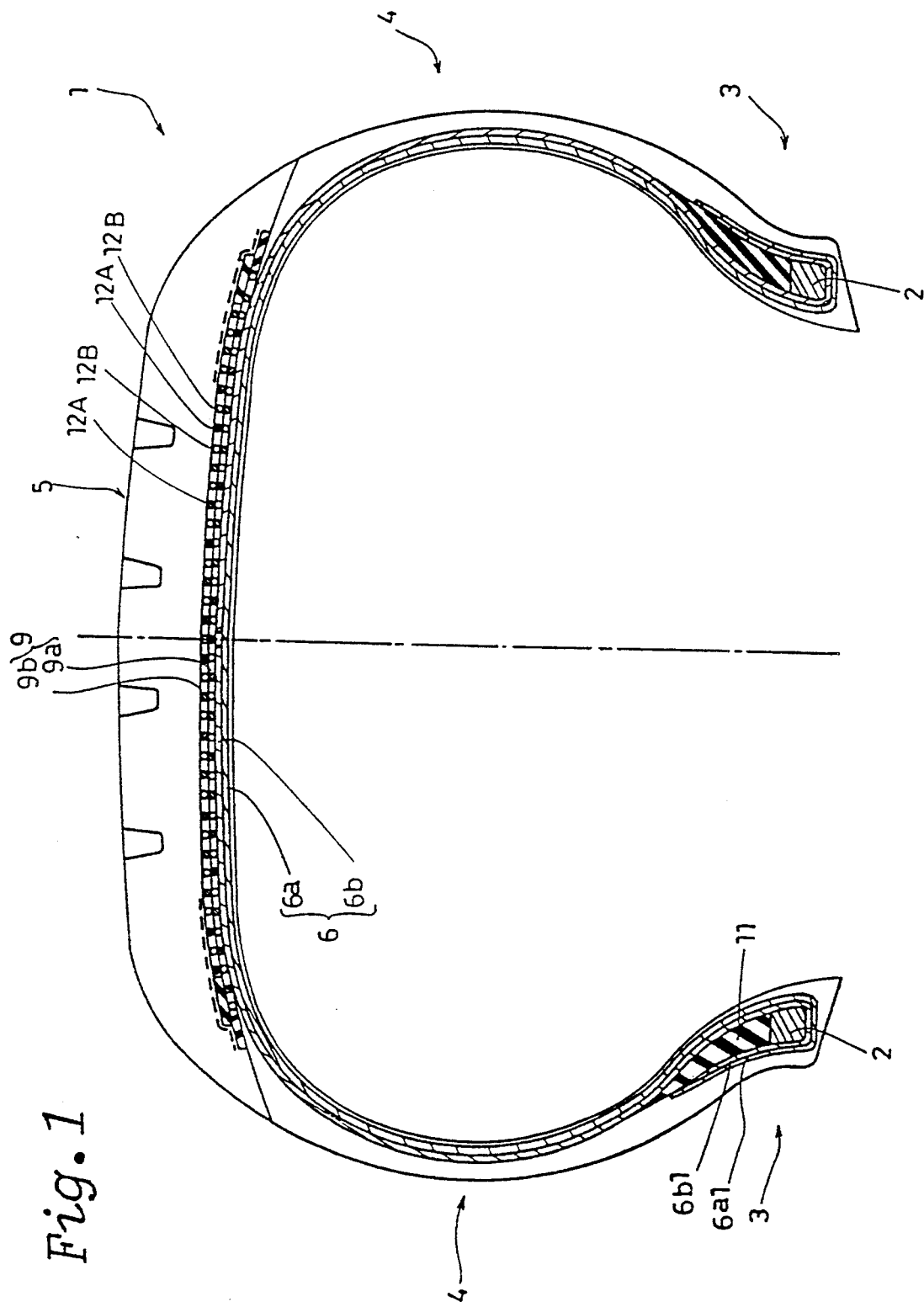
FIG. 1 is a cross sectional view of a tire according to the present invention.

In the figures, pneumatic tire 1 has a tread portion 5, a pair of axially spaced bead portions 3, and a pair of sidewall portions 4 extending between the tread edges and the bead portions 3. Tire 1 comprises a pair of bead cores 2 disposed one in each of the bead portions 3, a toroidal carcass 6 having at least one ply of cords extending between the bead portions 3 and laid at an angle of 90 to 60 degrees with respect to the tire equator so that the carcass is provided with a radial or semiradial structure, and a belt 9 disposed radially outside the carcass 6 and inside a rubber tread.

In this embodiment, the carcass 6 comprises two plies 6a and 6b of cords extending between the bead cores 2 and turned up therearound from the axially inside to the outside of the tire. The carcass cords in each ply cross those in the next ply.

The axially outward turned up portion 6a1 of the carcass ply 6a extends radially outwardly over the radially outer edge of the axially outward turned up portion 6b1 of the carcass ply 6b so as to cover this edge, whereby stress concentration on the turned up edge can be prevented to improve bead durability.

For the carcass cords, organic fiber cords, e.g. nylon, polyester, rayon, aromatic polyamide and the like are preferably used.

In order to reinforce the bead portion 3 and lower sidewall portion, a bead apex 11 made of hard rubber is disposed between the main portion and each of the turned up portions of the carcass 6. The bead apex 11 extends taperingly radially outwardly from the bead core 2.

The belt 9 comprises at least one ply of parallel cords including steel cords 12A and aromatic polyamide cords 12B.

In this embodiment, the belt 9 is composed of two plies 9a and 9b, each of which has both steel cords 12A and aromatic polyamide cords 12B.

The cords 12A and 12B in each belt ply are laid parallel with each other and inclined at an angle of from 15 to 30 degrees with respect to the tire equator to cross the next belt ply.

Figure 2:
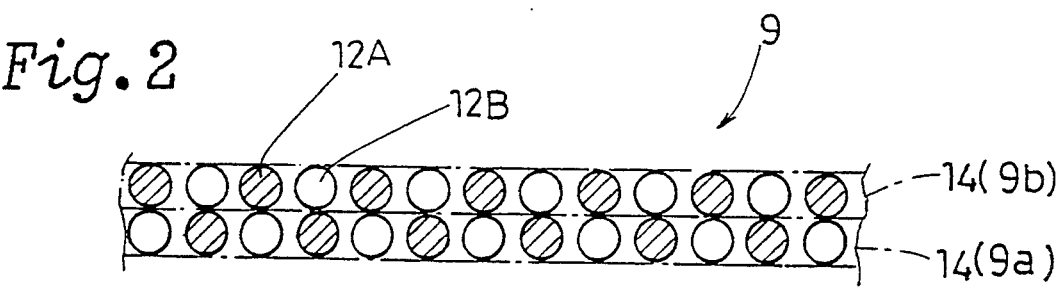
FIG. 2 is an enlarged cross sectional view of the belt.

FIG. 2 shows the belt cord arrangement, wherein in each of the belt plies 9a and 9b, the steel cords 12A and the aromatic polyamide cords 12B are disposed alternately in a plurality of sequences in the widthwise direction of the belt as follows:

(12A, 12B, 12A, 12B, - - - )
(steel:aramid=1:1)

Figure 3:
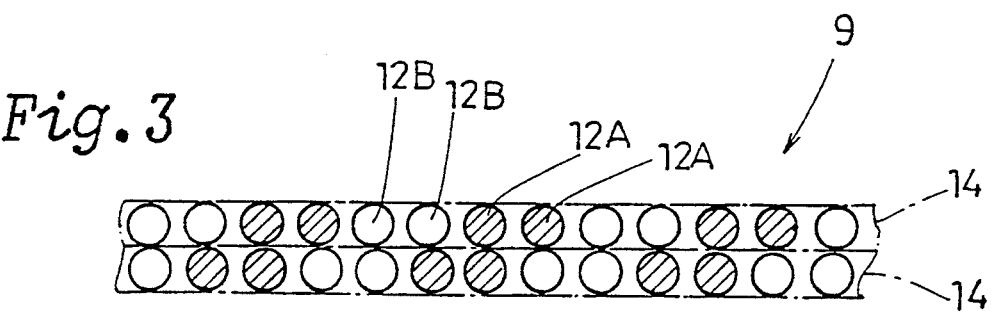
FIGS. 3 and 4 are cross sectional views showing modifications of the belt cord arrangement.

FIG. 3 shows still another example of the belt cord arrangement, wherein in each of the belt plies 9a and 9b, the cord arrangement is (12A, 12A, 12B, 12B, 12A, 12A, 12B, 12B, - - - )
(steel:aramid=2:2)

Figure 4:
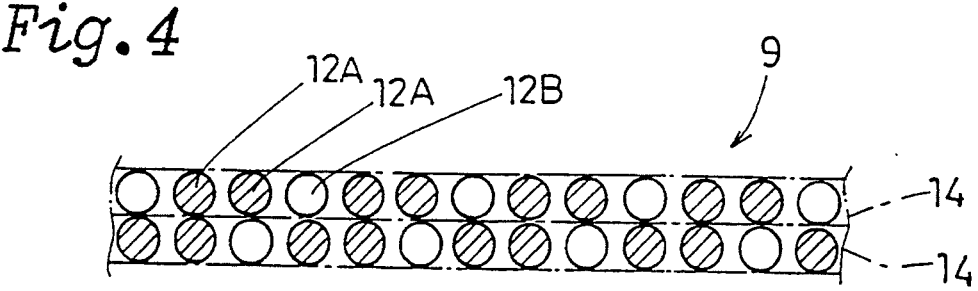

FIG. 4 shows another example of the belt cord arrangement, wherein in each of the belt plies 9a and 9b, the cord arrangement is (12A, 12A, 12B, 12A, 12A, 12B, - - - )
(steel:aramid=2:1)

In the above-explained examples, the ratio of the steel cord count to the aromatic polyamide cord count is constant all over the width. However, the ratio can be varied.

Figure 5:
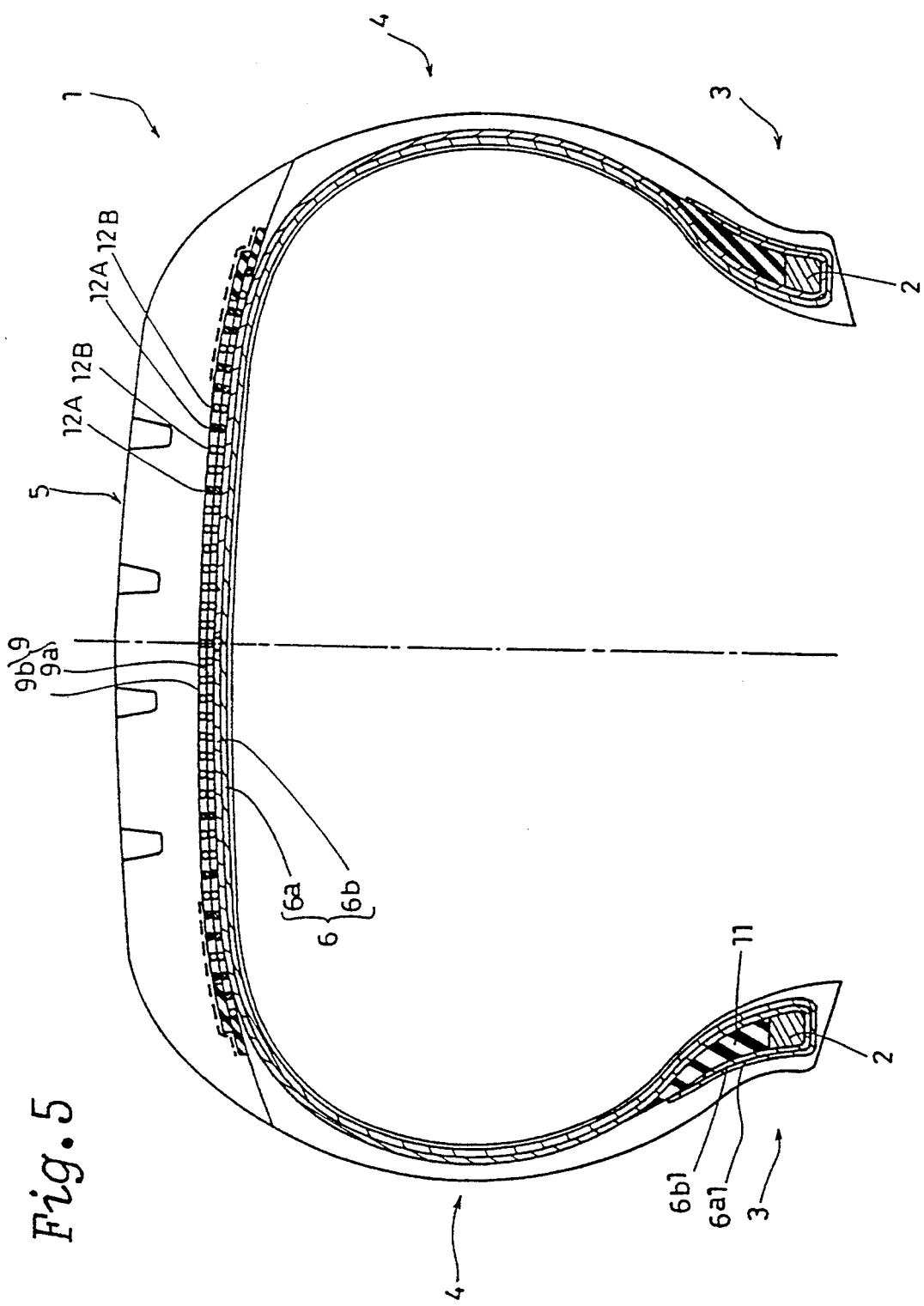
FIG. 5 is a cross sectional view of another tire according to the present invention.
Figure 6:
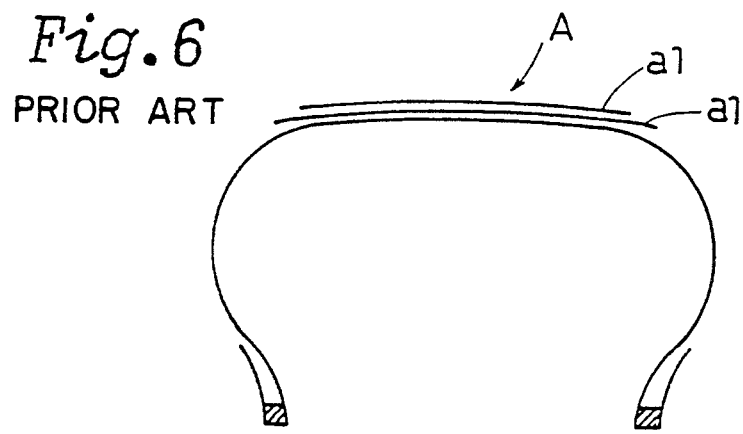
FIGS. 6-8 are cross sectional views explaining belts according to prior art tires.
Figure 7:
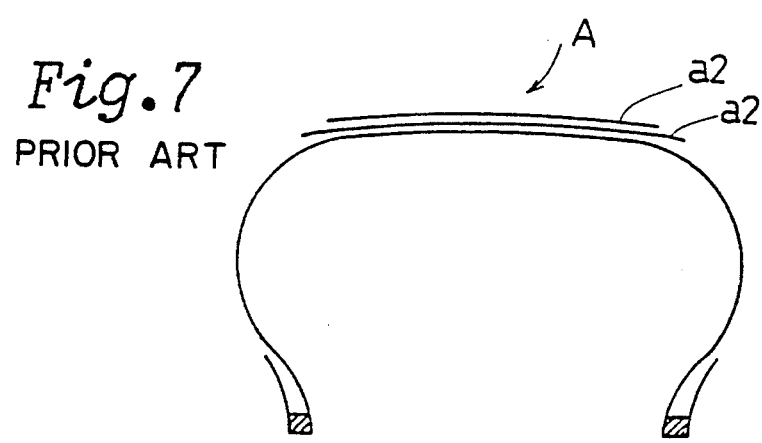
Figure 8:
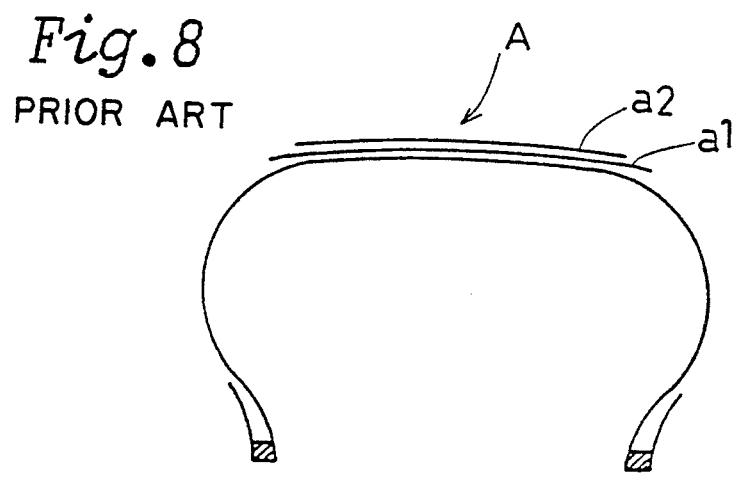

FIG. 5 shows another tire according to the invention, wherein the ratio of the steel cord count to the aromatic polyamide cord count is varied.

In this embodiment, the belt 9 is composed of two plies 9a and 9b, each of which is made of steel cords 12A and aromatic polyamide cords 12B.

In each of the plies, the ratio of the steel cord count to the aromatic polyamide cord count is increased from the tire equator toward both sides thereof.

The cords 12A and 12B in each ply are laid in parallel with each other and inclined at an angle of 0 to 30 degrees with respect to the tire equator so as to cross the cords 12A and 12B in the next ply. Therefore, the rigidity of the belt becomes higher in the tread shoulder portions than the tread central portion, whereby ride comfort can be improved while maintaining steering stability.

In the present invention, a single material cord belt ply composed of only single material cords, e.g. steel cords, aromatic polyamide cords and the like can be used together with the above-mentioned hybrid belt ply or plies.

The above-mentioned belt plies can be formed by winding a strip of rubberized fabric around the carcass, in which fabric steel cords and aromatic polyamide cords are alternately embedded in topping rubber. Further, the belt plies can be formed by winding at least one steel cord and at least one aromatic polyamide cord together or separately around the carcass or the previously formed ply.

As described above, in the pneumatic tires according to the present invention, the belt comprises a hybrid belt ply made of steel cords and aromatic polyamide cords. Therefore, the characteristics of the belt, e.g. bending rigidity, can be easily adjusted by changing the ratio of the steel cord count to the aromatic polyamide cord count, which helps to improve tire performance and decrease tire weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire comprising
a carcass extending between the bead portion and turned up around bead cores, and
a belt disposed radially outside the carcass and inside a tread,
said belt comprising at least one ply of parallel cords including steel cords and aromatic polyamide cords arranged in a plurality of sequences in the widthwise direction of said belt and the ratio of the steel cord count to the aromatic polyamide cord count in each of said sequences in each said ply being varied in the widthwise direction of said belt.

2. The tire according to claim 1, wherein said ratio increases from the tire equator toward both sides thereof.

3. The tire according to claim 1, wherein said belt comprises a plurality of plies of the steel cords and the aromatic polyamide cords.

4. The tire according to claim 1, wherein said belt comprises a plurality of plies of the steel cords and the aromatic polyamide cords, and the ratio of each said ply increases from the tire equator toward both sides thereof.

5. The tire according to any of claims 1, 2, 3 or 4 wherein said belt further comprises at least one single material cord belt ply.

6. A pneumatic tire according to claim 1 wherein each of said sequences includes a first grouping of at least one of said steel cords adjacent to a second grouping of at least one of said aromatic polyamide cords.

* * * * *